(12) United States Patent
Yonemoto

(10) Patent No.: US 12,745,017 B2
(45) Date of Patent: Sep. 22, 2026

(54) OPERATING METHOD OF PIXEL CIRCUIT ADOPTING OPTICALLY SENSITIVE MATERIAL TO SUPPRESS DARK CURRENT

(71) Applicant: PixArt Imaging Inc., Hsin-Chu County (TW)

(72) Inventor: Kazuya Yonemoto, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 152 days.

(21) Appl. No.: 18/940,905

(22) Filed: Nov. 8, 2024

(65) Prior Publication Data

US 2025/0071444 A1 Feb. 27, 2025

Related U.S. Application Data

(63) Continuation of application No. 18/385,920, filed on Nov. 1, 2023, now Pat. No. 12,170,857, which is a continuation of application No. 17/873,161, filed on Jul. 26, 2022, now Pat. No. 11,849,237.

(51) Int. Cl.

*H04N 25/77* (2023.01)
*H04N 25/63* (2023.01)
*H04N 25/75* (2023.01)

(52) U.S. Cl.

CPC ............. *H04N 25/77* (2023.01); *H04N 25/63* (2023.01); *H04N 25/75* (2023.01)

(58) Field of Classification Search

CPC ........ H04N 25/77; H04N 25/63; H04N 25/75; H04N 25/44; H10F 39/802

See application file for complete search history.

(56) References Cited

U.S. PATENT DOCUMENTS

2019/0221594 A1* 7/2019 Sasago .................. H04N 25/76

* cited by examiner

*Primary Examiner* — Thanh Luu
*Assistant Examiner* — Mai Thi Ngoc Tran
(74) *Attorney, Agent, or Firm* — WPAT, PC

(57) ABSTRACT

There is provided a pixel circuit including an optically sensitive material (OSM) layer and a readout circuit. The OSM layer is arranged upon the readout circuit, and used to sense light energy to generate signal charges to be integrated in a floating diffusion. The readout circuit includes a source follower for amplifying a voltage on the floating diffusion within a readout interval, and the voltage on the floating diffusion is not changed by an external voltage pulse within the readout interval.

20 Claims, 6 Drawing Sheets

OPERATING METHOD OF PIXEL CIRCUIT ADOPTING OPTICALLY SENSITIVE MATERIAL TO SUPPRESS DARK CURRENT

This application is a continuation application of U.S. patent application Ser. No. 18/385,920 filed on Nov. 1, 2023, which is a continuation application of U.S. patent application Ser. No. 17/873,161 filed on Jul. 26, 2022, and the full disclosures of which are incorporated herein by reference.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a pixel circuit and an operating method thereof and, more particularly, to a pixel circuit adopting optically sensitive material and an operating method thereof that reduce dark current in a floating diffusion without departing from an operating voltage range of a source follower.

2. Description of the Related Art

It is known that the image quality of an image sensor can be improved using an optically sensitive material (OSM) integrating charges to a floating diffusion. However, there is an issue that the floating diffusion has dark current to form fixed pattern noises that can degrade the image quality. It is already known that a voltage difference of a PN junction between the floating diffusion and a surrounding well thereof is a reason to cause the dark current. The dark current variation can be represented by an equation $K\times f(V_{FD}-V_{well})$, wherein $V_{FD}$ is a reset voltage of the floating diffusion, $V_{well}$ is a voltage of the surrounding well of the floating diffusion, f(x) is a probability function of generating the dark current, and K is a parameter between 100 and 10000.

To suppress the dark current, the reset voltage of the floating diffusion is selected to be as close to a voltage of the surrounding well as possible, e.g., substantially 0 volt. However, a readout circuit of the pixel circuit generally has a source follower to amplify signal charges integrated in the floating diffusion. If the reset voltage of the floating diffusion is set to 0 volt which is outside an operating voltage range of the source follower, the voltage on the floating diffusion cannot be readout.

To solve the issue of unable to readout the voltage on the floating diffusion, U.S. patent publication No. 2017/0013218 provides positive pulses to a top electrode of the OSM within a pixel readout interval to cause the voltage on the floating diffusion to be temporarily within the operating voltage range of the source follower. However, the device power consumption is increased at the same time.

In addition, JP 2019-125907 provides a capacitor connected parallel to the floating diffusion. Within a pixel readout interval, positive pulses are provided to the capacitor to cause the voltage on the floating diffusion to be temporarily within the operating voltage range of the source follower. However, the conversion gain of the floating diffusion is degraded.

Accordingly, the present disclosure provides a pixel circuit that does not temporarily change the voltage on a floating diffusion to be within an operating voltage range of a source follower connected behind within a readout interval.

SUMMARY

The present disclosure provides a pixel circuit that adopts different types of transistors to be connected to a floating diffusion node in the pixel circuit and an operating method thereof.

The present disclosure further provides a pixel circuit that adopts an IGZO transistor and NMOS transistors in the pixel circuit and an operating method thereof.

The present disclosure provides an operating method of a pixel circuit. The pixel circuit includes a floating diffusion (FD) node, an optically sensitive material (OSM) layer, a reset transistor having a source as the FD node, a readout transistor connected to the FD node and a row selection transistor connected to the readout transistor. The reset transistor is arranged within a P-well substrate of the pixel circuit, and the readout transistor and the row selection transistor are arranged within an N-well region in the P-well substrate. The operating method includes the steps of: providing an exposure control signal to the OSM layer to integrate charges into the FD node; providing a row selection signal to the row selection transistor to cause the charges integrated in the FD node to form a first voltage drop on an output voltage via the readout transistor; providing a reset control signal to the reset transistor to cause a reset voltage to form a second voltage drop on the output voltage via the readout transistor, wherein the reset voltage is arranged between ±1 volt and −0.5 volt relative to a voltage of the P-well substrate to cause the readout transistor to operate within a linear region thereof.

The present disclosure further provides an operating method of a pixel circuit. The pixel circuit includes a floating diffusion (FD) node, an optically sensitive material (OSM) layer, a reset transistor having a source as the FD node, a readout transistor connected to the FD node and a row selection transistor connected to the readout transistor. The readout transistor and the row selection transistor are arranged within a P-well substrate of the pixel circuit, and the reset transistor is arranged within an N-well region in the P-well substrate. The operating method includes the steps of: providing an exposure control signal to the OSM layer to integrate charges into the FD node; providing a row selection signal to the row selection transistor to cause the charges integrated in the FD node to form a first voltage rise on an output voltage via the readout transistor; providing a reset control signal to the reset transistor to cause a reset voltage to form a second voltage rise on the output voltage via the readout transistor, wherein the reset voltage is arranged between +0.5 volt and −1 volt relative to a voltage source coupled to a drain of the readout transistor to cause the readout transistor to operate within a linear region thereof.

The present disclosure further provides an operating method of a pixel circuit. The pixel circuit includes a floating diffusion (FD) node, an optically sensitive material (OSM) layer, an IGZO transistor having a source as the FD node, a readout transistor connected to the FD node and a row selection transistor connected to the readout transistor. The operating method includes the steps of: providing an exposure control signal to the OSM layer to integrate charges into the FD node; providing a row selection signal to the row selection transistor to cause the charges integrated in the FD node to form a voltage rise on an output voltage via the readout transistor; providing a reset control signal to the IGZO transistor to cause a reset voltage to form a voltage drop on the output voltage via the readout transistor, wherein the reset voltage is arranged between +0.5 volt and −1 volt relative to a voltage source coupled to a drain of the readout transistor to cause the readout transistor to operate within an operating voltage region thereof.

In the present disclosure, the OSM layer is, for example, an organic photoconductive film or a quantum dots film, but not limited thereto.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

One objective of the present disclosure is to provide a pixel circuit and an operating method thereof that can reduce dark current in a floating diffusion node without using a voltage pulse to temporarily change, within a readout interval (e.g., shown as row selection interval herein), a voltage of the floating diffusion node to be within an operating voltage range of a source follower transistor coupled behind the floating diffusion node.

Figure 1A:
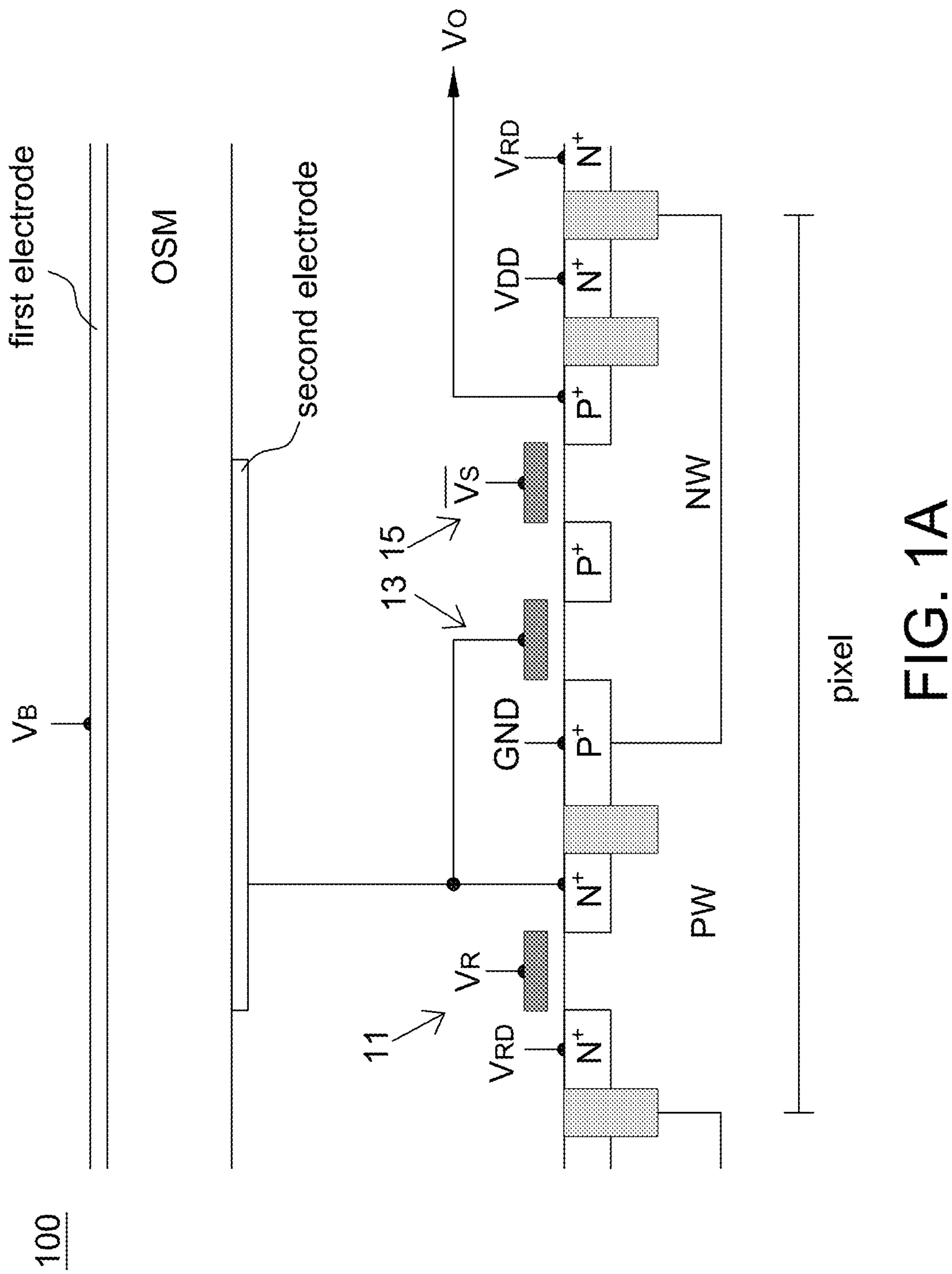
FIG. 1A is a cross sectional view of a pixel circuit according to a first embodiment of the present disclosure.
Figure 1B:
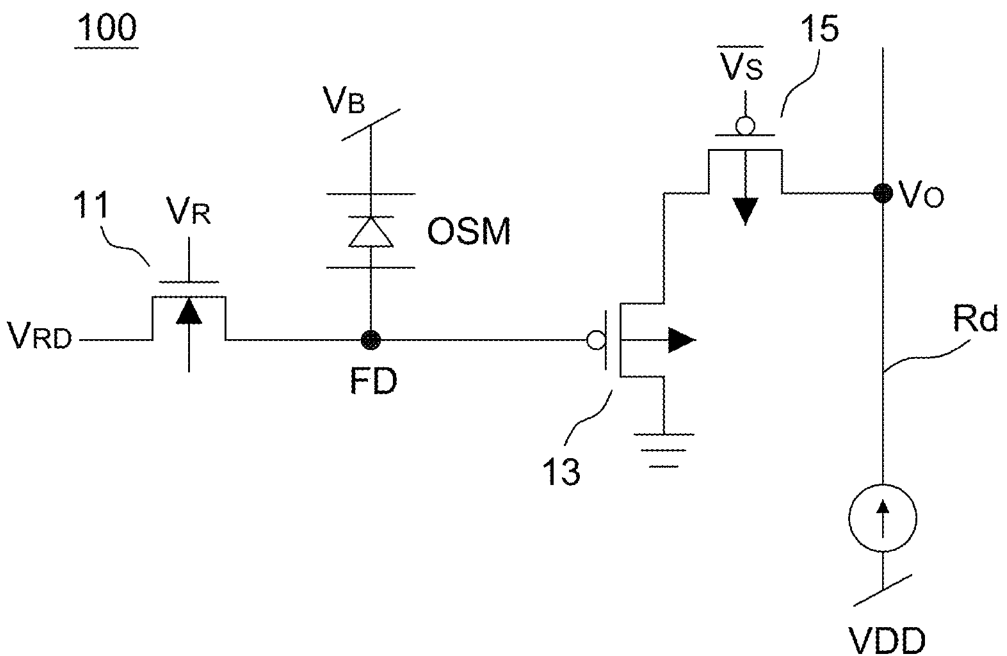
FIG. 1B is a circuit diagram of a pixel circuit according to a first embodiment of the present disclosure.
Figure 1C:
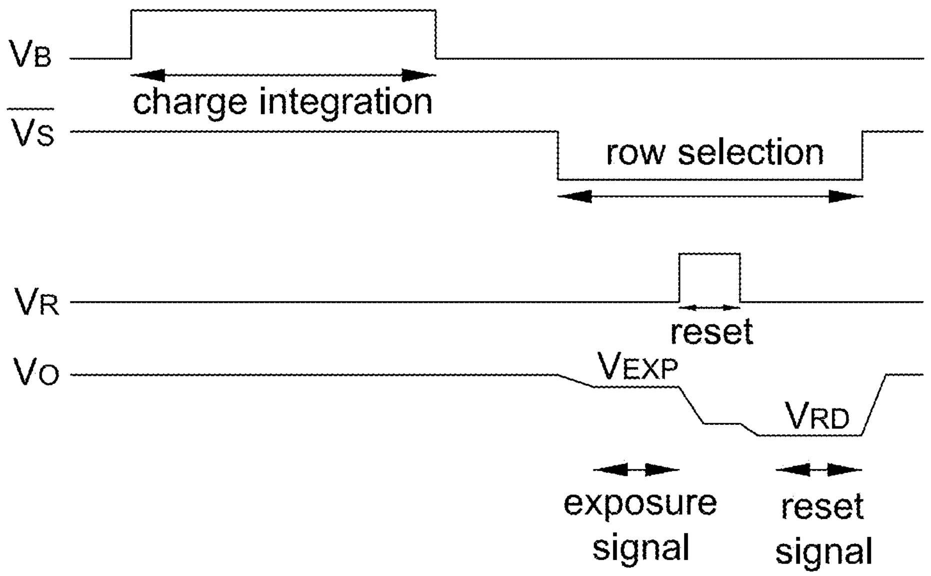
FIG. 1C is an operational timing diagram of a pixel circuit according to a first embodiment of the present disclosure.

Please refer to FIGS. 1A to 1C, FIG. 1A is a cross sectional view of a pixel circuit 100 according to a first embodiment of the present disclosure; FIG. 1B is a circuit diagram of a pixel circuit 100 according to a first embodiment of the present disclosure; and FIG. 1C is an operational timing diagram of a pixel circuit 100 according to a first embodiment of the present disclosure.

The pixel circuit 100 includes an optically sensitive material (OSM) layer and a readout circuit, wherein the OSM layer is arranged upon/above the readout circuit. It is seen from FIG. 1A that the OSM layer covers upon a reset transistor 11, a readout transistor 13 and a row selection transistor 15.

As shown in FIG. 1A, the OSM layer is sandwiched between a first electrode and a second electrode, wherein the first electrode is preferably made of transparent material to form a transparent electrode, e.g., including indium tin oxide (ITO) and indium zinc oxide (IZO), but not limited thereto. The second electrode is connected to a node FD, which is used as a floating diffusion node of the pixel circuit 100. The OSM layer is used to receive light penetrating the first electrode to generate signal charges, which are integrated into the node FD. In other words, a voltage on the node FD reflects detected light energy of the pixel circuit 100.

The readout circuit uses the double sampling technique to read light energy sensed by the OSM layer within an exposure interval (e.g., an interval of charge integration shown in FIG. 1C). The readout circuit includes a reset transistor 11, a readout transistor 13 and a row selection transistor 15 arranged on a P-well substrate (shown as PW in FIG. 1A), wherein the reset transistor 11 is an NMOS transistor, and the readout transistor 13 and the row selection transistor 15 are PMOS transistors.

In the first embodiment, a gate of the reset transistor 11 receives an exposure control signal $V_R$ to control the voltage reset of a reset voltage $V_{RD}$ (coupled to a drain of the reset transistor 11) to the node FD. A source of the reset transistor 11 is used as the node FD.

The readout transistor 13 is used as a source follower transistor for amplifying a voltage on the node FD to a readout line Rd. Therefore, a gate of the readout transistor 13 is coupled to the node FD. A drain of the readout transistor 13 is connected to a ground voltage. A source of the readout transistor 13 is common to a drain of the row selection transistor 15.

A gate of the row selection transistor 15 receives a row selection signal $\overline{V}s$, which is provided by, for example, a row decoder to a pixel array to determine which of the pixel row is readout, which is known to the art and not a main objective of the present disclosure and thus details thereof are not described herein. The row selection transistor 15 is coupled between the readout transistor 13 and the readout line Rd, and is used to output a voltage on the node FD according to the row selection signal $\overline{V}s$.

Please refer to FIG. 1A again, the pixel circuit 100 further includes an N-well region (shown as NW) for electrically separating the readout transistor 13 and the row selection transistor 15 from the P-well substrate. A drain of the readout transistor 13 extends from the N-well region to the P-well substrate. The drain of the readout transistor 13 is common to the P-well substrate such that the P-well substrate is also coupled to the ground voltage.

Please refer to FIGS. 1A and 1C at the same time, the first electrode receives an exposure control signal $V_B$ such that charges are integrated into the node FD within an exposure interval (e.g., shown as high voltage interval of $V_B$). In a readout interval (e.g., shown as low voltage interval of $\overline{V}s$), charges in the node FD form a first voltage drop on the output voltage Vo (e.g., VDD initially) to readout an exposure signal $V_{EXP}$. Next, the reset transistor 11 is turned on (e.g., shown as high voltage interval of $V_R$) using the reset control signal $V_R$ such that the reset voltage $V_{RD}$ (e.g., 0 volt) forms a second voltage drop on the output voltage Vo to readout a reset signal $V_{RD}$. Finally, a voltage different $V_{EXP}-V_{RD}$ is calculated (e.g., using a processor of the image sensor) as a detected voltage of the pixel circuit 100.

In the first embodiment, in order to cause the readout transistor 13 to operate within a linear region thereof, the reset voltage $V_{RD}$ is arranged to be between +1 volt and −0.5 volt relative to a voltage of the P-well substrate. For example, if the voltage of the P-well substrate is set as 0 volt to suppress dark current, $V_{RD}$ is arranged between 1 volt and −0.5 volt, preferably 0 volt.

Figure 2A:
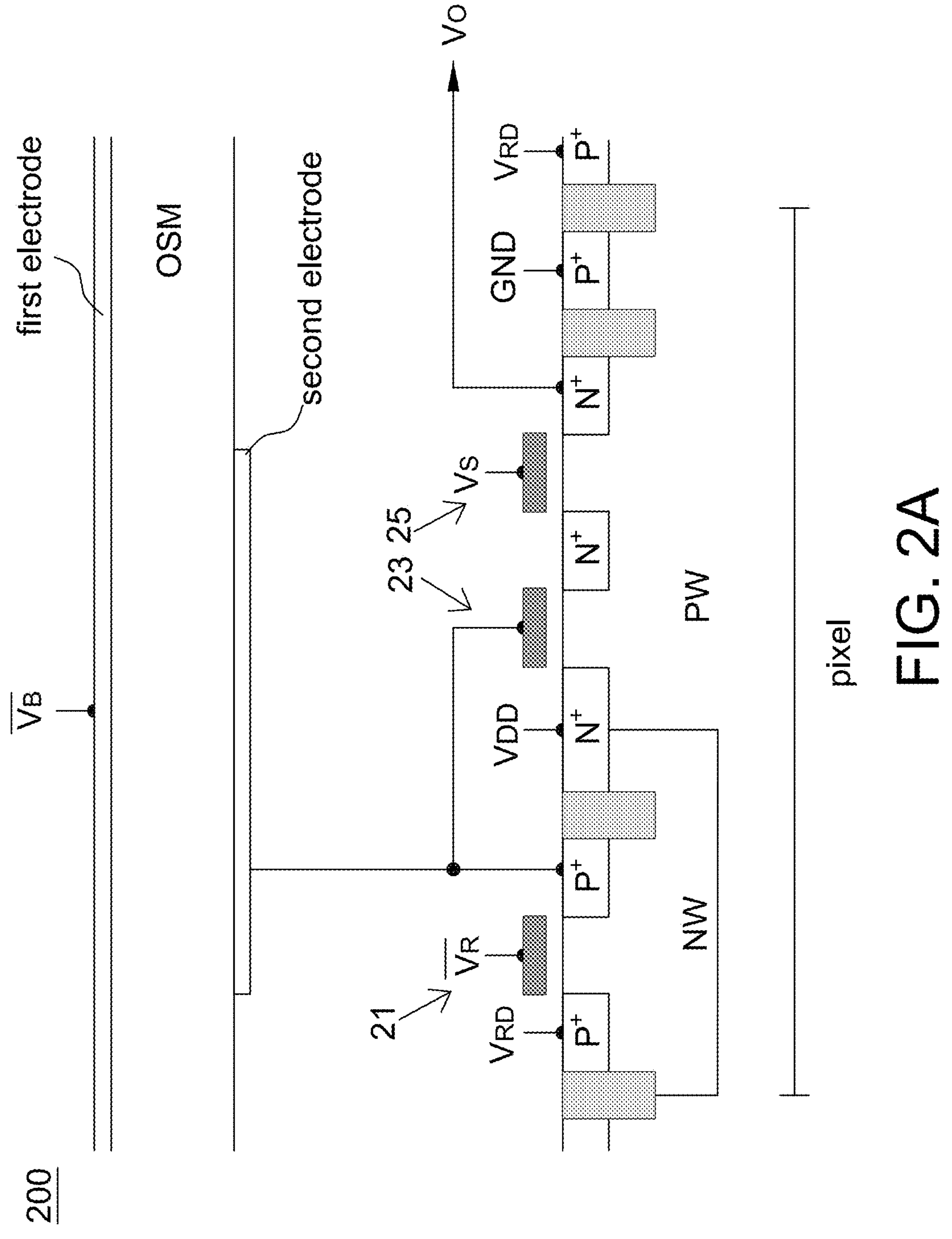
FIG. 2A is a cross sectional view of a pixel circuit according to a second embodiment of the present disclosure.
Figure 2B:
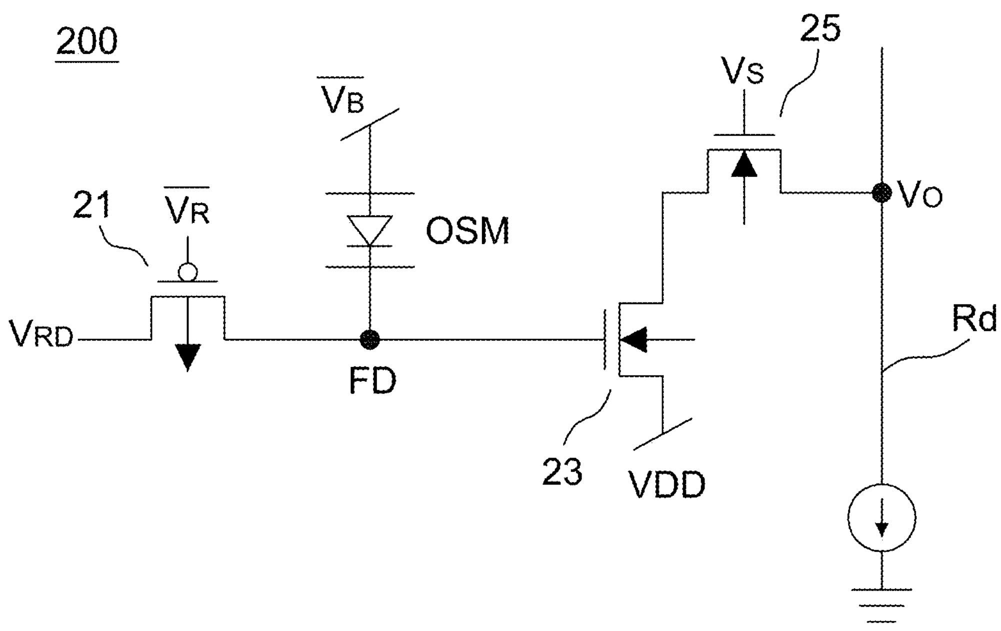
FIG. 2B is a circuit diagram of a pixel circuit according to a second embodiment of the present disclosure.
Figure 2C:
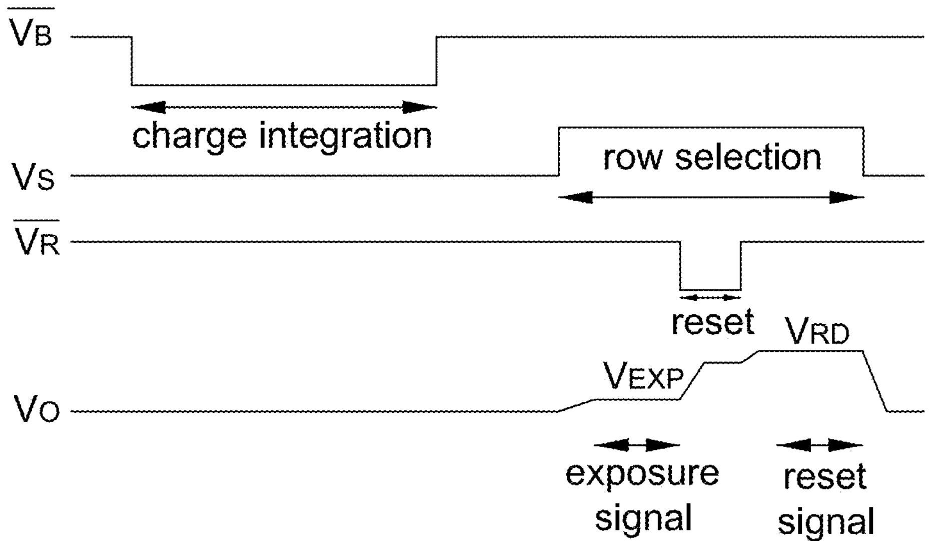
FIG. 2C is an operational timing diagram of a pixel circuit according to a second embodiment of the present disclosure.

Please refer to FIGS. 2A to 2C, FIG. 2A is a cross sectional view of a pixel circuit 200 according to a second embodiment of the present disclosure; FIG. 2B is a circuit diagram of a pixel circuit 200 according to a second embodiment of the present disclosure; and FIG. 2C is an operational timing diagram of a pixel circuit 200 according to a second embodiment of the present disclosure.

The pixel circuit 200 also includes an optically sensitive material (OSM) layer and a readout circuit, wherein the OSM layer is arranged upon/above the readout circuit. It is seen from FIG. 2A that the OSM layer covers upon a reset transistor 21, a readout transistor 23 and a row selection transistor 25.

As shown in FIG. 2A, the OSM layer is sandwiched between a first electrode and a second electrode, wherein the first electrode is preferably made of transparent material to form a transparent electrode, e.g., including ITO and IZO, but not limited thereto. The second electrode is connected to a node FD, which is used as a floating diffusion node of the pixel circuit 200. The OSM layer is used to receive light penetrating the first electrode to generate signal charges, which are integrated into the node FD. In other words, a voltage on the node FD reflects detected light energy of the pixel circuit 200.

The readout circuit also uses the double sampling technique to read light energy sensed by the OSM layer within an exposure interval (e.g., an interval of charge integration shown in FIG. 2C). The readout circuit includes a reset transistor 21, a readout transistor 23 and a row selection transistor 25 arranged on a P-well substrate (shown as PW in FIG. 2A), wherein the reset transistor 21 is a PMOS transistor, and the readout transistor 23 and the row selection transistor 25 are NMOS transistors.

In the second embodiment, a gate of the reset transistor 21 receives an exposure control signal $\overline{V}_R$ to control the voltage reset of a reset voltage $V_{RD}$ (coupled to a drain of the reset transistor 21) to the node FD. A source of the reset transistor 21 is used as the node FD.

The readout transistor 23 is used as a source follower transistor for amplifying a voltage on the node FD to a readout line Rd. Therefore, a gate of the readout transistor 23 is coupled to the node FD. A drain of the readout transistor 23 is connected to a voltage source VDD. A source of the readout transistor 23 is common to a drain of the row selection transistor 25.

A gate of the row selection transistor 25 receives a row selection signal $V_S$, which is provided by, for example, a row decoder to a pixel array to determine which of the pixel row is readout as mentioned above. The row selection transistor 25 is coupled between the readout transistor 23 and the readout line Rd, and is used to output a voltage on the node FD according to the row selection signal $V_S$.

Please refer to FIG. 2A again, the pixel circuit 200 further includes an N-well region (shown as NW) in the P-well substrate. The N-well region is for electrically separating the reset transistor 21 from the P-well substrate, and the reset transistor 21 is arranged within the N-well region. A drain of the readout transistor 23 extends from the N-well region to the P-well substrate. The drain of the readout transistor 23 is common to the N-well region such that the N-well region is also coupled to the voltage source VDD.

Please refer to FIGS. 2A and 2C at the same time, the first electrode receives an exposure control signal $\overline{V}_B$ such that charges are integrated into the node FD within an exposure interval (e.g., shown as low voltage interval of $\overline{V}_B$). In a readout interval (e.g., shown as high voltage interval of $V_S$), charges in the node FD form a first voltage rise on the output voltage Vo (e.g., 0 initially) to readout an exposure signal $V_{EXP}$. Next, the reset transistor 21 is turned on (e.g., shown as low voltage interval of $\overline{V}_R$) using the reset control signal $\overline{V}_R$ such that the reset voltage $V_{RD}$ (e.g., VDD) forms a second voltage rise on the output voltage Vo to readout a reset signal $V_{RD}$. Finally, a voltage different $V_{RD}-V_{EXP}$ is calculated (e.g., using a processor of the image sensor) as a detected voltage of the pixel circuit 200.

In the second embodiment, in order to cause the readout transistor 23 to operate within a linear region thereof, the reset voltage $V_{RD}$ is arranged to be between +0.5 volt and −1 volt relative to the voltage source VDD coupled to the drain of the readout transistor 23. For example, if the voltage of the N-well region is set as 3 volt (i.e. VDD=3 volt) to suppress dark current, $V_{RD}$ is arranged between 3.5 volt and 2 volt, preferably 3 volt.

It should be mentioned that although $\overline{V}_B$, $V_S$ and $\overline{V}_R$ in FIG. 2C are shown to be respectively out of phase from $V_B$, $\overline{V}_S$ and $V_R$ in FIG. 1C for illustration purposes, the present disclosure is not limited thereto.

Figure 3A:
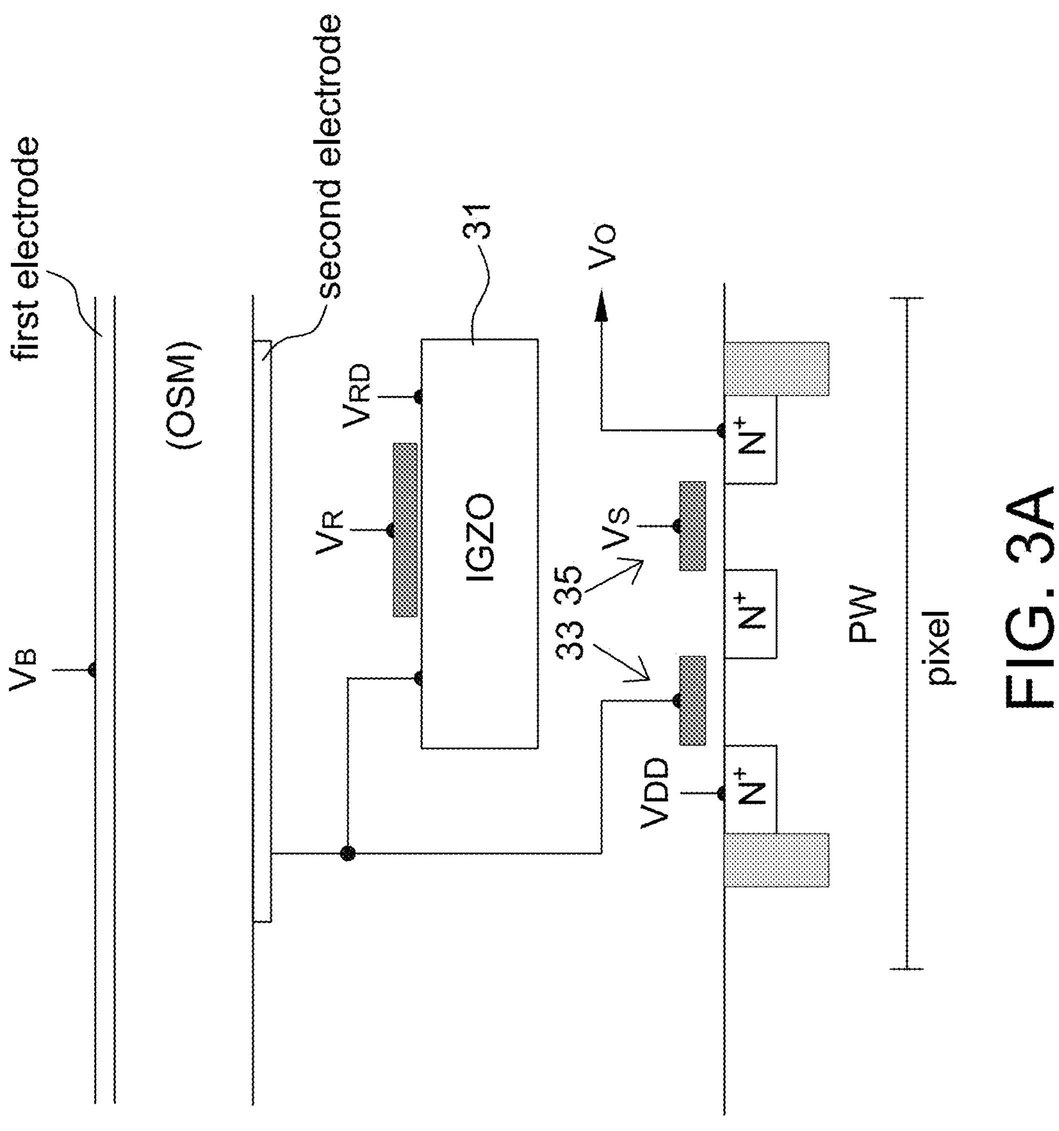
FIG. 3A is a cross sectional view of a pixel circuit according to a third embodiment of the present disclosure.
Figure 3B:
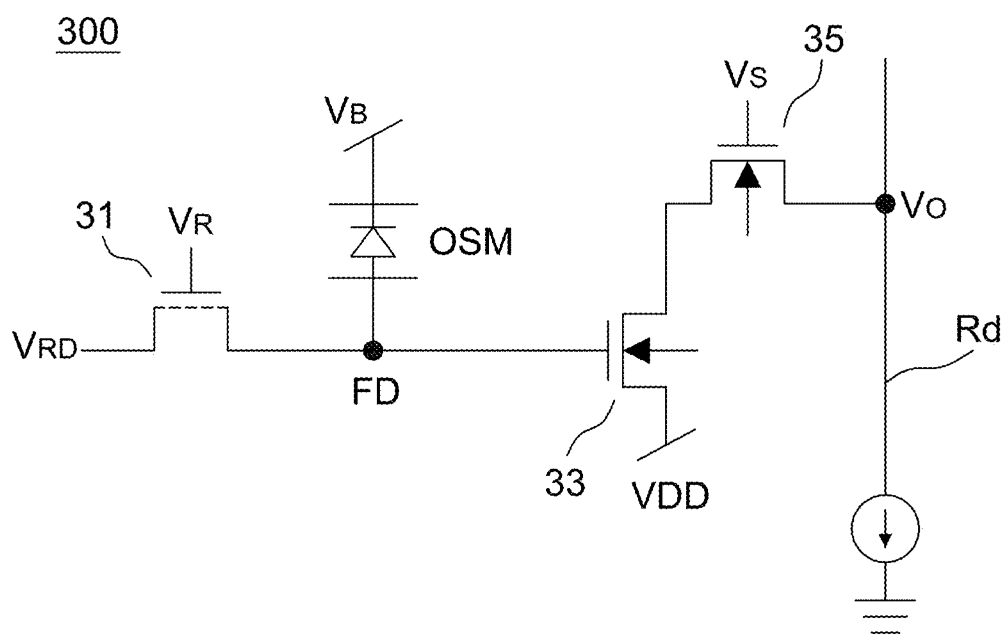
FIG. 3B is a circuit diagram of a pixel circuit according to a third embodiment of the present disclosure.
Figure 3C:
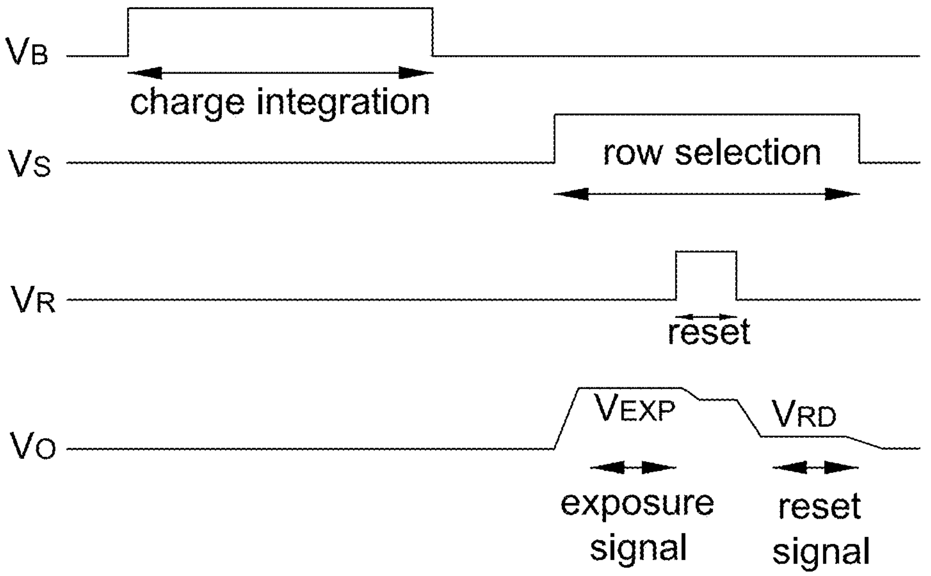
FIG. 3C is an operational timing diagram of a pixel circuit according to a third embodiment of the present disclosure.

Please refer to FIGS. 3A to 3C, FIG. 3A is a cross sectional view of a pixel circuit 300 according to a third embodiment of the present disclosure; FIG. 3B is a circuit diagram of a pixel circuit 300 according to a third embodiment of the present disclosure; and FIG. 3C is an operational timing diagram of a pixel circuit 300 according to a third embodiment of the present disclosure.

The pixel circuit 300 also includes an optically sensitive material (OSM) layer and a readout circuit, wherein the OSM layer is arranged upon/above the readout circuit. It is seen from FIG. 3A that the OSM layer covers upon an IGZO transistor 31, a readout transistor 33 and a row selection transistor 35.

As shown in FIG. 3A, the OSM layer is sandwiched between a first electrode and a second electrode, wherein the first electrode is preferably made of transparent material to form a transparent electrode, e.g., including ITO and IZO, but not limited thereto. The second electrode is connected to a node FD, which is used as a floating diffusion node of the pixel circuit 300. The OSM layer is used to receive light penetrating the first electrode to generate signal charges, which are integrated into the node FD. In other words, a voltage on the node FD reflects detected light energy of the pixel circuit 300.

The readout circuit also uses the double sampling technique to read light energy sensed by the OSM layer within an exposure interval (e.g., an interval of charge integration shown in FIG. 3C). The readout circuit includes an IGZO transistor 31 (shown as IGZO, used as a reset transistor), a readout transistor 33 and a row selection transistor 35. The readout transistor 33 and the row selection transistor 35 are arranged on a P-well substrate (shown as PW in FIG. 3A), wherein the IGZO transistor 31 is stacked between the OSM layer and the readout transistor 33, i.e. arranged between the OSM layer and the readout transistor 33 in a longitudinal direction. In the third embodiment, the readout transistor 33 and the row selection transistor 35 are NMOS transistors.

In the third embodiment, a gate of the IGZO transistor 31 receives an exposure control signal $V_R$ to control the voltage reset of a reset voltage $V_{RD}$ (coupled to a drain of the IGZO transistor 31) to the node FD. A source of the IGZO transistor 31 is used as the node FD.

The readout transistor 33 is used as a source follower transistor for amplifying a voltage on the node FD to a readout line Rd. Therefore, a gate of the readout transistor 33 is coupled to the node FD. A drain of the readout transistor 33 is connected to a voltage source VDD. A source of the readout transistor 33 is common to a drain of the row selection transistor 35.

A gate of the row selection transistor 35 receives a row selection signal $V_S$, which is provided by, for example, a row decoder to a pixel array to determine which of the pixel row is readout as mentioned above. The row selection transistor 35 is coupled between the readout transistor 33 and the readout line Rd, and is used to output a voltage on the node FD according to the row selection signal $V_S$.

Please refer to FIGS. 3A and 3C at the same time, the first electrode receives an exposure control signal $V_B$ such that charges are integrated into the node FD within an exposure interval (e.g., shown as high voltage interval of $V_B$). In a readout interval (e.g., shown as high voltage interval of $V_S$), charges in the node FD form a voltage rise on the output voltage Vo (e.g., 0 initially) to readout an exposure signal $V_{EXP}$. Next, the IGZO transistor 31 is turned on (e.g., shown as high voltage interval of $V_R$) using the reset control signal $V_R$ such that the reset voltage $V_{RD}$ (e.g., VDD) forms a voltage drop (or voltage rise according to a value of $V_{RD}$) on the output voltage Vo to readout a reset signal $V_{RD}$. Finally, a voltage different $V_{EXP}-V_{RD}$ (or $V_{RD}-V_{EXP}$) is calculated (e.g., using a processor of the image sensor) as a detected voltage of the pixel circuit 300.

In the third embodiment, the reset voltage $V_{RD}$ is selected to be between +0.5 volt and −1 volt relative to the voltage source VDD coupled to the drain of the readout transistor 33. For example, if the voltage on the node FD is set as 3 volt to suppress dark current, $V_{RD}$ is arranged between 3.5 volt and 2 volt. However, the present disclosure is not limited thereto. Because the node FD is in the IGZO transistor 31 which has an extremely low dark current, e.g., referring to a paper "High Performance In—Zn—O FET with High On-current and Ultralow (<$10^{-20}$ A/μm) Off-state Leakage Current for Si CMOS BEOL Application" published by N. Saito et al., compared to the second embodiment, the reset voltage $V_{FD}$ is possible to be selected from a wider range without being limited to be close to VDD.

The present disclosure is configured to cause the node FD not to receive, within an interval that the row selection transistors 15, 25 and 35 are turned on by a row selection signal (i.e. row selection interval shown in FIGS. 1C, 2C and 3C), any external voltage pulse, in addition to the signal charges and the reset voltage $V_{RD}$, to temporarily change a voltage thereon to be within a linear range of a source follower connected behind.

It should be mentioned that a size of the second electrode with respect to the first electrode in FIGS. 1A, 2A and 3A is only intended to illustrate but not to limit the present disclosure.

The pixel circuits in the above embodiments are adapted to all pixel circuits of a pixel array of an image sensor.

It should be mentioned that although the above embodiments are described using a single pixel circuit among a pixel array and because multiple pixel circuits of a pixel array have an identical structure, one of ordinary skill in the art would understand operations of the rest pixel circuits in the pixel array after understanding the operation of the signal pixel circuit, e.g., with the difference in time points of voltage rising/falling of control signals (including reset control signals, exposure control signals and row selection signals) received by different pixel rows, and thus details thereof are not repeated herein.

As mentioned above, to suppress dark current in a floating diffusion, a voltage on the floating diffusion is preferably controlled to be substantially identical to a voltage of a P-well region or an N-well region surrounding the floating diffusion, but that can cause the voltage on the floating diffusion to depart from an operating voltage range of a source follower connected behind. Accordingly, the present disclosure further provides a pixel circuit (e.g., FIGS. 1B, 2B and 3B) and an operating method thereof (referring to FIGS. 1C, 2C and 3C) that arrange different types of transistors in a readout circuit to cause a reset voltage on a floating diffusion node to be within an operating voltage range of a source follower transistor connected behind. In this way, it is not necessary to change the voltage on the floating diffusion node using another voltage pulse to achieve the purposes of lowering power consumption and maintaining conversion gain of the pixel circuit.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An operating method of a pixel circuit, the pixel circuit comprising a floating diffusion (FD) node, an optically sensitive material (OSM) layer, a reset transistor having a source as the FD node, a readout transistor connected to the FD node and a row selection transistor connected to the readout transistor, the reset transistor being arranged within a P-well substrate of the pixel circuit, and the readout transistor and the row selection transistor being arranged within an N-well region in the P-well substrate, the operating method comprising:

providing an exposure control signal to the OSM layer to integrate charges into the FD node;

providing a row selection signal to the row selection transistor to cause the charges integrated in the FD node to form a first voltage drop on an output voltage via the readout transistor;

providing a reset control signal to the reset transistor to cause a reset voltage to form a second voltage drop on the output voltage via the readout transistor, wherein the reset voltage is arranged between +1 volt and −0.5 volt relative to a voltage of the P-well substrate to cause the readout transistor to operate within a linear region thereof.

2. The operating method as claimed in claim 1, wherein the OSM layer is arranged upon the reset transistor, the readout transistor and the row selection transistor, and the OSM layer is an organic photoconductive film or a quantum dots film.

3. The operating method as claimed in claim 1, wherein the voltage of the P-well substrate is set as 0 to suppress dark current.

4. The operating method as claimed in claim 1, further comprising:

calculating a different between a first voltage formed by the first voltage drop and a second voltage formed by the second voltage drop as a detected voltage of the pixel circuit.

5. The operating method as claimed in claim 1, wherein a drain of the readout transistor is common to the P-well substrate, and the readout transistor is configured as a source follower transistor.

6. The operating method as claimed in claim 1, wherein a drain of the readout transistor extends from the N-well region to the P-well substrate.

7. The operating method as claimed in claim 1, wherein a gate of the row selection transistor is configured to receive the row selection signal, and a gate of the reset transistor is configured to receive the reset control signal.

8. An operating method of a pixel circuit, the pixel circuit comprising a floating diffusion (FD) node, an optically sensitive material (OSM) layer, a reset transistor having a source as the FD node, a readout transistor connected to the FD node and a row selection transistor connected to the readout transistor, the readout transistor and the row selection transistor being arranged within a P-well substrate of the pixel circuit, and the reset transistor being arranged within an N-well region in the P-well substrate, the operating method comprising:

providing an exposure control signal to the OSM layer to integrate charges into the FD node;

providing a row selection signal to the row selection transistor to cause the charges integrated in the FD node to form a first voltage rise on an output voltage via the readout transistor;

providing a reset control signal to the reset transistor to cause a reset voltage to form a second voltage rise on the output voltage via the readout transistor, wherein the reset voltage is arranged between +0.5 volt and −1 volt relative to a voltage source coupled to a drain of the readout transistor to cause the readout transistor to operate within a linear region thereof.

9. The operating method as claimed in claim 8, wherein the OSM layer is arranged upon the reset transistor, the readout transistor and the row selection transistor, and the OSM layer is an organic photoconductive film or a quantum dots film.

10. The operating method as claimed in claim 8, wherein the voltage source is set as 3 volts to suppress dark current.

11. The operating method as claimed in claim 8, further comprising:

calculating a different between a first voltage formed by the first voltage rise and a second voltage formed by the second voltage rise as a detected voltage of the pixel circuit.

12. The operating method as claimed in claim 8, wherein the drain of the readout transistor is common to the N-well region, and the readout transistor is configured as a source follower transistor.

13. The operating method as claimed in claim 12, wherein the drain of the readout transistor extends from the N-well region to the P-well substrate.

14. The operating method as claimed in claim 8, wherein a gate of the row selection transistor is configured to receive the row selection signal, and a gate of the reset transistor is configured to receive the reset control signal.

15. An operating method of a pixel circuit, the pixel circuit comprising a floating diffusion (FD) node, an optically sensitive material (OSM) layer, an IGZO transistor having a source as the FD node, a readout transistor connected to the FD node and a row selection transistor connected to the readout transistor, the operating method comprising:

providing an exposure control signal to the OSM layer to integrate charges into the FD node;

providing a row selection signal to the row selection transistor to cause the charges integrated in the FD node to form a voltage rise on an output voltage via the readout transistor;

providing a reset control signal to the IGZO transistor to cause a reset voltage to form a voltage drop on the output voltage via the readout transistor, wherein the reset voltage is arranged between +0.5 volt and −1 volt relative to a voltage source coupled to a drain of the readout transistor to cause the readout transistor to operate within an operating voltage region thereof.

16. The operating method as claimed in claim 15, wherein the OSM layer is an organic photoconductive film or a quantum dots film.

17. The operating method as claimed in claim 15, wherein the IGZO transistor is stacked between the OSM layer and the readout transistor.

18. The operating method as claimed in claim 15, wherein a gate of the row selection transistor is configured to receive the row selection signal, and a gate of the IGZO transistor is configured to receive the reset control signal.

19. The operating method as claimed in claim 18, wherein in an interval during which the row selection signal turns on the row selection transistor, the FD node does not receive any, in addition to the signal charges and the reset voltage, voltage pulse to change a voltage thereon.

20. The operating method as claimed in claim 15, further comprising:

calculating a different between a first voltage formed by the voltage rise and a second voltage formed by the voltage drop as a detected voltage of the pixel circuit.

* * * * *